US012645659B2

(12) United States Patent
Oh

(10) Patent No.: US 12,645,659 B2
(45) Date of Patent: Jun. 2, 2026

(54) METHOD OF RSA ACCUMULATOR-BASED LOOKUP ARGUMENT ON COMPOSITE NUMBER AND DUPLICATED ELEMENT

(71) Applicant: Zkrypto Inc., Seoul (KR)

(72) Inventor: Hyun ok Oh, Seoul (KR)

(73) Assignee: Zkrypto Inc., Seoul (KR)

( * ) Notice: Subject to any disclaimer, the term of this patent is extended or adjusted under 35 U.S.C. 154(b) by 0 days.

(21) Appl. No.: 18/986,718

(22) Filed: Dec. 19, 2024

(65) Prior Publication Data

US 2026/0086994 A1    Mar. 26, 2026

(30) Foreign Application Priority Data

Sep. 24, 2024    (KR) ........................ 10-2024-0129080

(51) Int. Cl.
G06F 16/00        (2019.01)
G06F 7/58         (2006.01)
G06F 16/22        (2019.01)

(52) U.S. Cl.
CPC ............ G06F 16/2255 (2019.01); G06F 7/58 (2013.01)

(58) Field of Classification Search
None
See application file for complete search history.

(56) References Cited

U.S. PATENT DOCUMENTS

| | | | | |
|---|---|---|---|---|
| 7,027,597 B1 * | 4/2006 | Stojancic | .............. | H04L 9/3249 708/502 |
| 7,027,598 B1 * | 4/2006 | Stojancic | .............. | H04L 9/3249 708/502 |

| | | | | |
|---|---|---|---|---|
| 7,187,770 B1 * | 3/2007 | Maddury | .............. | H04L 9/0841 708/490 |
| 7,925,011 B2 * | 4/2011 | Gopal | ..................... | H04L 9/302 380/30 |
| 11,394,749 B2 * | 7/2022 | Buck | ........................ | H04L 63/20 |
| 11,416,821 B1 * | 8/2022 | Stewart | ................... | G06F 16/21 |
| 11,562,032 B1 * | 1/2023 | Stewart | ................... | G06F 16/93 |
| 11,562,451 B1 * | 1/2023 | Kozlowski, III | ....... | G06F 16/27 |

(Continued)

FOREIGN PATENT DOCUMENTS

| | | | | | |
|---|---|---|---|---|---|
| CN | 102325024 A | * | 1/2012 | .......... | H04L 9/3033 |
| CN | 111901101 A | * | 11/2020 | .......... | H04L 9/0869 |
| CN | 110958112 B | * | 6/2022 | .......... | H04L 9/0618 |

*Primary Examiner* — Jean M Corrielus

(74) *Attorney, Agent, or Firm* — Nicholas Park

(57) ABSTRACT

The technical concept of the present invention relates to an RSA accumulator-based lookup argument method for performing lookup argument on a composite number and duplicated element. According to an embodiment of the present disclosure, RSA accumulator-based lookup argument method performed by at least one processor may include obtaining a table vector including a plurality of table values, generating a plurality of prime number random values, generating a plurality of prime number table values respectively corresponding to the plurality of table values by using the plurality of prime number random values, generating a prime number table vector by using the plurality of prime number table values and the plurality of prime number random values, publishing the prime number table vector, and performing RSA accumulator-based lookup argument by using the prime number table vector to check whether an index value is included in the table vector.

9 Claims, 10 Drawing Sheets

(56)           References Cited

U.S. PATENT DOCUMENTS

| | | | |
|---|---|---|---|
| 2004/0086117 A1* | 5/2004 | Petersen ............... | H04L 9/0668 |
| | | | 380/44 |
| 2008/0144811 A1* | 6/2008 | Gopal ..................... | G06F 7/723 |
| | | | 380/30 |
| 2016/0197724 A1* | 7/2016 | Nemiroff .............. | H04L 9/0662 |
| | | | 380/46 |
| 2020/0201679 A1* | 6/2020 | Wentz ..................... | G06F 9/468 |
| 2020/0382299 A1* | 12/2020 | Tanaka .................. | H04L 9/0869 |
| 2021/0152601 A1* | 5/2021 | Buck ....................... | H04L 63/20 |
| 2021/0314140 A1* | 10/2021 | Stephenson .............. | G06N 3/09 |
| 2023/0252098 A1* | 8/2023 | Stewart .............. | G06F 16/9536 |
| | | | 707/770 |
| 2024/0205010 A1* | 6/2024 | Oh ......................... | H04L 9/3218 |

* cited by examiner

FIG. 4

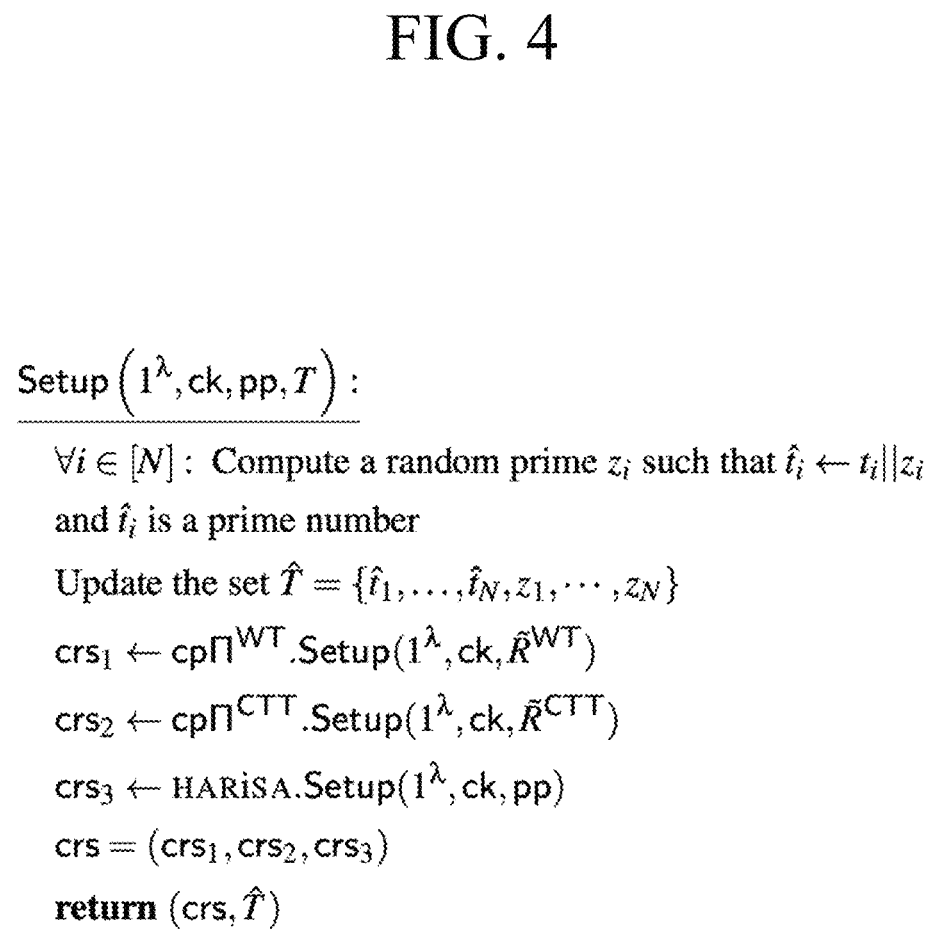

$\underline{\text{Setup}\left(1^{\lambda}, \text{ck}, \text{pp}, T\right):}$ $\forall i \in [N]:$ Compute a random prime $z_i$ such that $\hat{t}_i \leftarrow t_i \| z_i$ and $\hat{t}_i$ is a prime number Update the set $\hat{T} = \{\hat{t}_1, \ldots, \hat{t}_N, z_1, \cdots, z_N\}$ $\text{crs}_1 \leftarrow \text{cp}\Pi^{\text{WT}}.\text{Setup}(1^{\lambda}, \text{ck}, \hat{R}^{\text{WT}})$ $\text{crs}_2 \leftarrow \text{cp}\Pi^{\text{CTT}}.\text{Setup}(1^{\lambda}, \text{ck}, \bar{R}^{\text{CTT}})$ $\text{crs}_3 \leftarrow \text{HARiSA}.\text{Setup}(1^{\lambda}, \text{ck}, \text{pp})$ $\text{crs} = (\text{crs}_1, \text{crs}_2, \text{crs}_3)$ return $(\text{crs}, \hat{T})$

FIG. 5

| T | |
|---|---|
| t1(0010) | |
| t2(0100) | |
| t3(1010) | |
| t4(0011) | |
| t5(1001) | | concat
‖

| RV | |
|---|---|
| z1(0101) | |
| z2(0011) | |
| z3(0111) | |
| z4(1011) | |
| z5(1101) | |

| Th | |
|---|---|
| th1(00100101) | z1(0101) |
| th2(01000011) | z2(0011) |
| th3(10100111) | z3(0111) |
| th4(00111011) | z4(1011) |
| th5(10011101) | z5(1101) |

FIG. 6

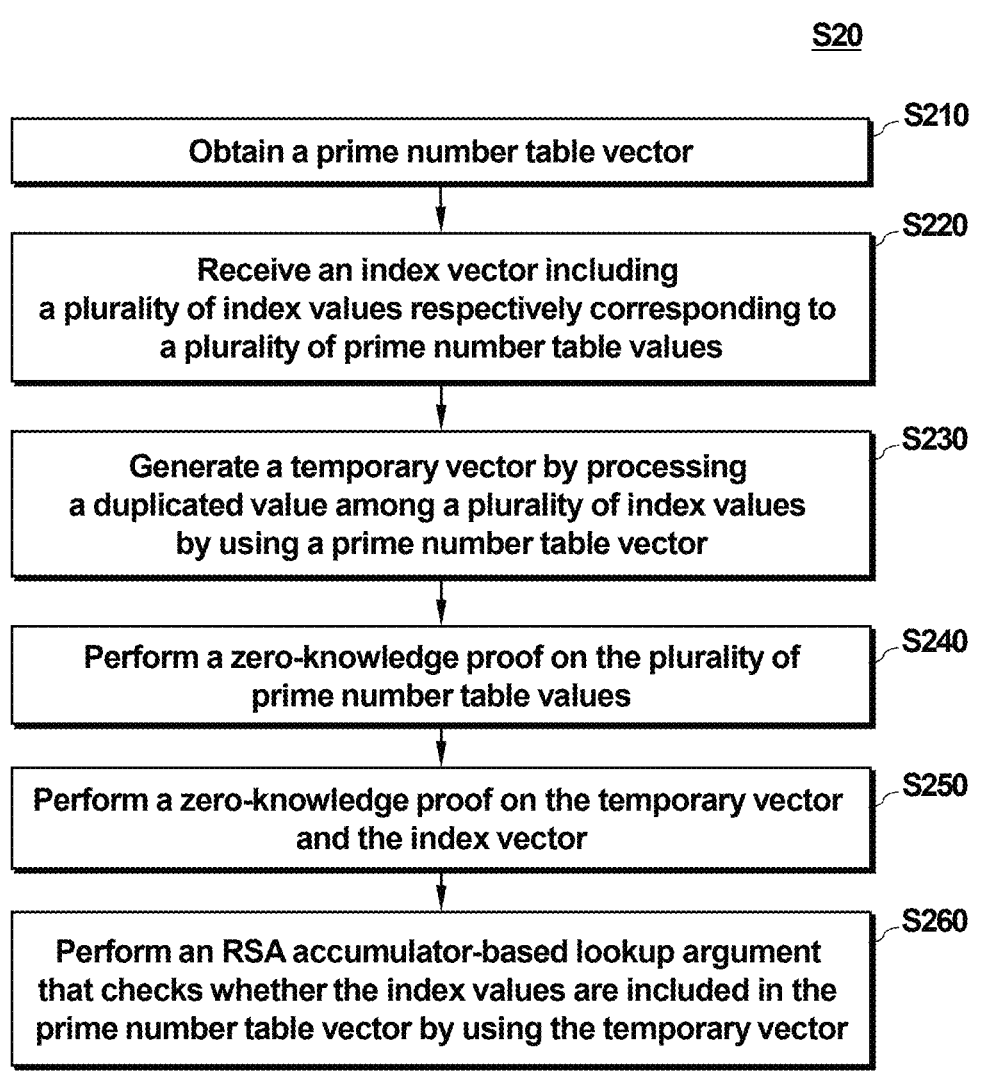

S20

Obtain a prime number table vector — S210

Receive an index vector including
a plurality of index values respectively corresponding to
a plurality of prime number table values — S220

Generate a temporary vector by processing
a duplicated value among a plurality of index values
by using a prime number table vector — S230

Perform a zero-knowledge proof on the plurality of
prime number table values — S240

Perform a zero-knowledge proof on the temporary vector
and the index vector — S250

Perform an RSA accumulator-based lookup argument
that checks whether the index values are included in the
prime number table vector by using the temporary vector — S260

FIG. 7

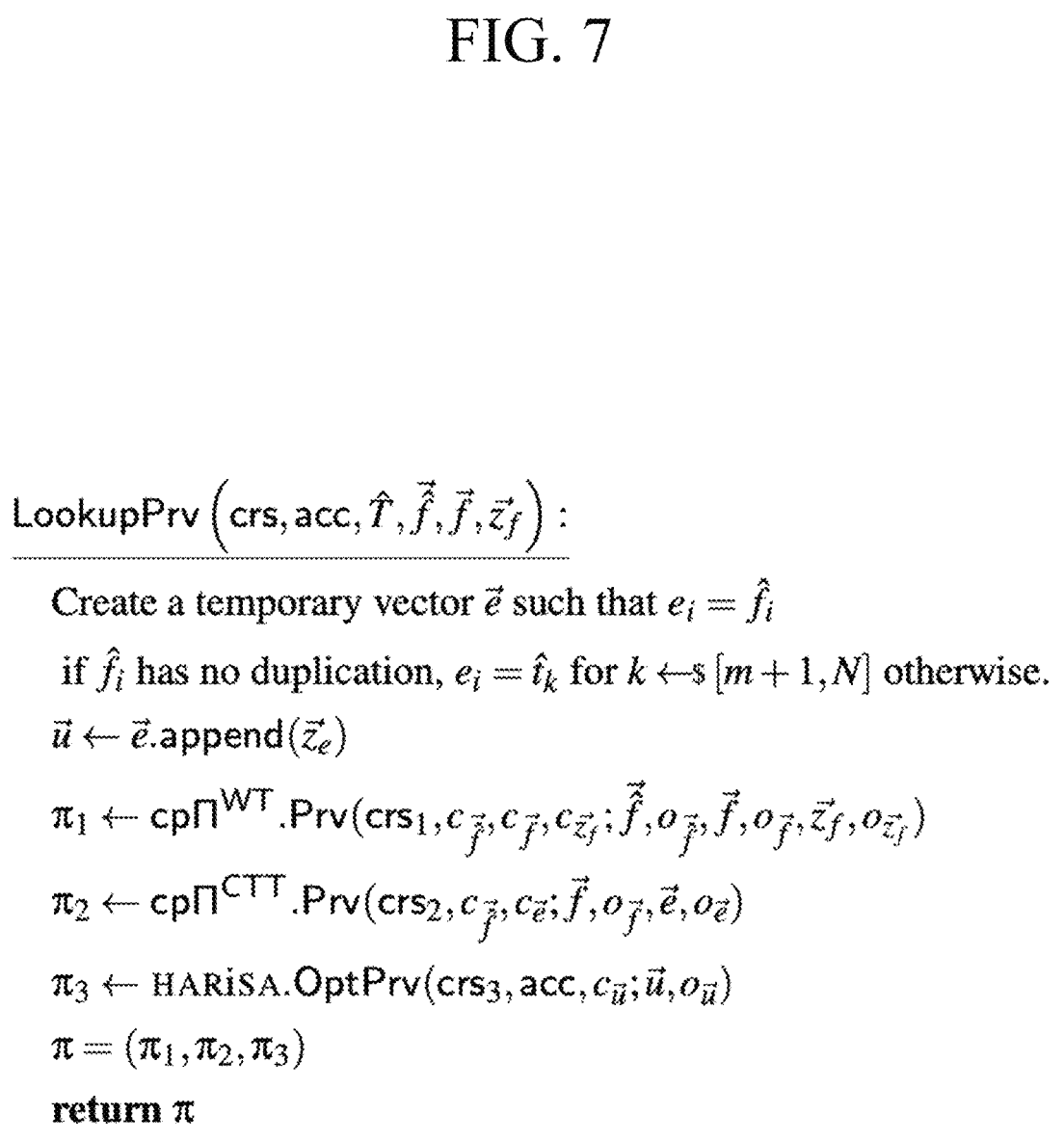

$\underline{\mathsf{LookupPrv}\left(\mathsf{crs},\mathsf{acc},\hat{T},\vec{\hat{f}},\vec{f},\vec{z}_f\right):}$ Create a temporary vector $\vec{e}$ such that $e_i = \hat{f}_i$ if $\hat{f}_i$ has no duplication, $e_i = \hat{t}_k$ for $k \leftarrow\$ [m+1, N]$ otherwise.

$\vec{u} \leftarrow \vec{e}.\mathsf{append}(\vec{z}_e)$ $\pi_1 \leftarrow \mathsf{cp\Pi}^{\mathsf{WT}}.\mathsf{Prv}(\mathsf{crs}_1, c_{\vec{\hat{f}}}, c_{\vec{f}}, c_{\vec{z}_f}; \vec{\hat{f}}, o_{\vec{\hat{f}}}, \vec{f}, o_{\vec{f}}, \vec{z}_f, o_{\vec{z}_f})$ $\pi_2 \leftarrow \mathsf{cp\Pi}^{\mathsf{CTT}}.\mathsf{Prv}(\mathsf{crs}_2, c_{\vec{\hat{f}}}, c_{\vec{e}}; \vec{f}, o_{\vec{f}}, \vec{e}, o_{\vec{e}})$ $\pi_3 \leftarrow \mathsf{HARiSA}.\mathsf{OptPrv}(\mathsf{crs}_3, \mathsf{acc}, c_{\vec{u}}; \vec{u}, o_{\vec{u}})$ $\pi = (\pi_1, \pi_2, \pi_3)$ return $\pi$

FIG. 8

| f |
|---|
| f1 = th1 |
| f2 = th2 |
| f3 = th2 |
| f4 = th4 | eliminate duplication →

| e |
|---|
| e1 = th1 |
| e2 = th2 |
| e3 = th5 |
| e4 = th4 |

FIG. 9

$$\text{LookupVfy}\left(\text{crs}, \text{acc}, c_{\vec{u}}, c_{\vec{f}}, c_{\vec{f}}, c_{\vec{z_f}}, c_{\vec{e}}, \pi\right):$$

Reject if $\text{cp}\Pi^{\text{WT}}.\text{Vfy}(\text{crs}_1, c_{\vec{f}}, c_{\vec{f}}, c_{\vec{z_f}}, \pi_1) \neq 1$ Reject if $\text{cp}\Pi^{\text{CTT}}.\text{Vfy}(\text{crs}_2, c_{\vec{f}}, c_{\vec{e}}, \pi_2) \neq 1$ Reject if $\text{HARiSA}.\text{Vfy}(\text{crs}_3, \text{acc}, c_{\vec{u}}, \pi_3) \neq 1$

1

METHOD OF RSA ACCUMULATOR-BASED LOOKUP ARGUMENT ON COMPOSITE NUMBER AND DUPLICATED ELEMENT

CROSS-REFERENCE TO RELATED APPLICATION

This application claims priority to and the benefit of Korean Patent Application No. 10-2024-0129080, filed Sep. 24, 2024, the disclosure of which is incorporated herein by reference in its entirety.

BACKGROUND

Technical Field

The present invention relates to a method of an RSA accumulator-based lookup argument method for performing look up argument on a composite number and a duplicated element.

Background Art

A zero-knowledge proof is frequently used to provide verifiability in a blockchain system that guarantees privacy or a cloud system that delegates calculations. Zero-knowledge Succinct Non-interactive ARguments of Knowledge (zk-SNARK) is widely used as the zero-knowledge proof algorithm, and zk-SNARK can prove that it has correctly performed an operation on any circuit without disclosing secret information used in the circuit.

In addition, a Rivest-Shamir-Adleman (RSA) accumulator-based proof of membership using the zero-knowledge proof method was introduced (Campanelli, M., Fiore, D., Han, S., Kim, J., Kolonelos, D., Oh, H.: Succinct zero-knowledge batch proofs for set accumulators). The RSA accumulator-based proof of membership method is a method in which it is possible to prove whether or not an index value is included in membership without leakage of privacy. However, the RSA accumulator-based proof of membership method has a limitation that it may be only used when index values are prime numbers and there are no duplicates among the index values.

SUMMARY

Technical Problem

One object of the present invention is to provide an RSA accumulator-based lookup argument method for providing a prime number table vector by converting composite numbers included in the table vector into prime numbers during the setup step.

Another object of the present invention is to provide an RSA accumulator-based lookup argument method for processing a duplicated element in a proof step.

Technical Solution

According to an embodiment of the present disclosure, an RSA accumulator-based lookup argument method performed by at least one processor may include: obtaining a table vector including a plurality of table values; generating a plurality of prime number random values; generating a plurality of prime number table values respectively corresponding to the plurality of table values by using the plurality of prime number random values; generating a prime number table vector using the plurality of prime number table values and the plurality of prime number random values; publishing the prime number table vector; and performing an RSA accumulator-based lookup argument to check whether an index value is included in the table vector by using the prime number table vector.

In an embodiment, the generating of the prime number table vector may include: performing a concatenation operation on each of the plurality of the table values with each of the plurality of prime number random values; checking whether a value on which the concatenation operation is performed is a prime number; determining the value as the prime number table value corresponding to the table value when the value on which the concatenation operation is performed is the prime number; and generating the plurality of prime number table values corresponding to the plurality of table values as the prime number table vector.

In an embodiment, the lookup argument method may further include: performing a zero-knowledge proof on the generating of the plurality of prime number table values as a result of the concatenation operation on the table values with the plurality of prime number random values; and transmitting a first proof value as a result of the zero-knowledge proof.

In an embodiment, the lookup argument method may further include: receiving an index vector including a plurality of index values respectively corresponding to at least one prime number table value; and generating a temporary vector including a plurality of temporary values by processing a duplicated value among the plurality of index values by using the prime number table vector.

In an embodiment, the generating of the temporary vector may include: replacing an index value duplicating another element of the index vector among the plurality of index values with any one of elements of the prime number table vector; and generating a vector generated as a result of the replacing as the temporary vector.

In an embodiment, the lookup argument method may further include: performing zero-knowledge proof with respect to the following equation where i-th element of the temporary vector is $e_i$ and i-th element of the index vector is $f_i$; and transmitting a second proof value as a result of the zero-knowledge proof.

$$\prod_{i=2}^{m}(f_i - e_i)\cdot(f_i - f_{i-1}) = 0 \wedge f_1 = e_1$$

In an embodiment, the performing of the RSA accumulator-based lookup argument may be performed outside a zero-knowledge proof circuit.

According to another embodiment of the present disclosure, the RSA accumulator-based lookup argument method performed by at least one processor may include: obtaining a prime number table vector including a plurality of prime number table values; receiving an index vector including a plurality of index values respectively correspond to at least one of the plurality of prime number table values; generating a temporary vector including a plurality of temporary values by processing a duplicated value among the plurality of index values by using the prime number table vector; and performing an RSA accumulator-based lookup argument to check whether the plurality of index values are included in the prime number table vector using the temporary vector.

In an embodiment, the generating of the temporary vector may include: replacing an index value duplicating another element of the index vector among the plurality of index values with one of the prime number table vector; and generating a vector generated as a result of the replacing as the temporary vector.

In an embodiment, the lookup argument method may further include: performing a zero-knowledge proof with respect to the following equation, where i-th element of the temporary vector is $e_i$ and i-th element of the index vector is $f_i$; and transmitting a proof value generated as a result of the zero-knowledge proof.

$$\prod_{i=2}^{m}(f_i - e_i)\cdot(f_i - f_{i-1}) = 0 \wedge f_1 = e_1$$

BRIEF DESCRIPTION OF THE DRAWINGS

FIG. 4 is a diagram illustrating a setup algorithm according to an example embodiment.

FIG. 5 is a diagram illustrating a setup step according to an example embodiment.

FIG. 6 is a flowchart illustrating a proof step S20 according to an example embodiment.

FIG. 7 is a diagram illustrating a proof algorithm according to an example embodiment.

FIG. 8 is a diagram illustrating a proof step according to an example embodiment.

FIG. 9 is a diagram illustrating a verification algorithm according to an example embodiment.

DETAILED DESCRIPTION

Figure 1:
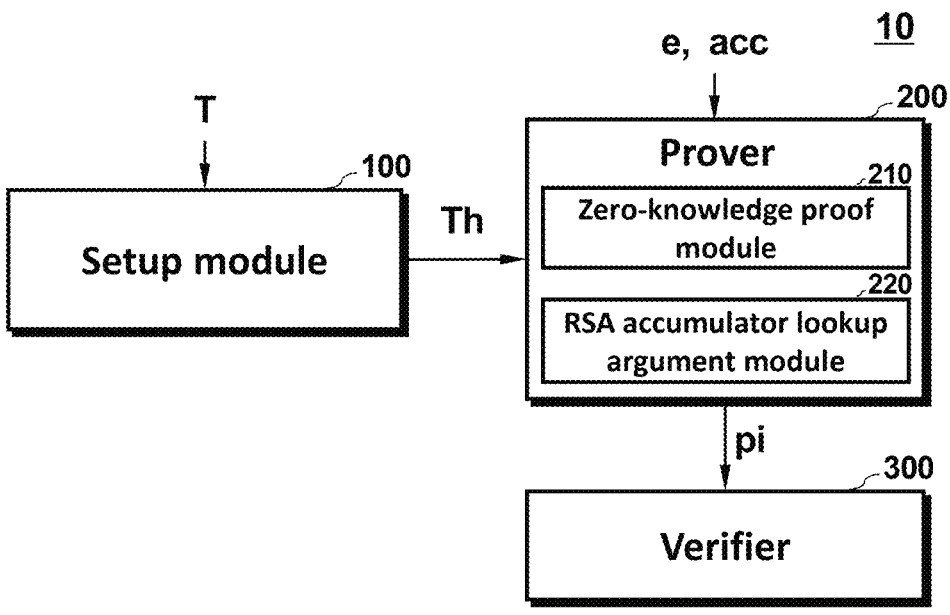
FIG. 1 is a block diagram of a lookup argument system according to an example embodiment.

Hereinafter, exemplary embodiments of the present disclosure will be described in detail with reference to the accompanying drawings. Advantages and features of the present disclosure, and methods of achieving the advantages and features will become apparent with reference to embodiments described below in detail in conjunction with the accompanying drawings. However, the technical spirit of the present invention is not limited to the following embodiments, but may be implemented in various different forms, and the following embodiments are provided only to complete the technical spirit of the present invention and to fully inform those skilled in the art to which the present invention pertains of the scope of the present invention, and the technical spirit of the present invention is only defined by the scope of claims.

It should be noted that, in adding reference numerals to elements of each drawing, the same elements are denoted by the same reference numerals as possible even though they are illustrated in different drawings. In addition, in describing the present disclosure, when it is determined that a detailed description of a related known configuration or function may obscure the gist of the present disclosure, the detailed description thereof will be omitted.

Unless otherwise defined, all terms (including technical and scientific terms) used herein have the same meaning as commonly understood by one of ordinary skill in the art to which the inventive concept belongs. In addition, terms defined in generally used dictionaries are not ideally or excessively interpreted unless they are clearly specifically defined. The terms used herein are for the purpose of describing the embodiments and are not intended to limit the present invention. In the present specification, a singular form includes a plural form unless otherwise specified.

In addition, in describing the components of the present disclosure, terms such as first, second, A, B, (a), (b), and the like may be used. The terms are only used to distinguish the elements from other elements, and the nature, order, or order of the corresponding elements is not limited by the terms. When it is described that a certain element is "connected", "coupled", or "connected" to another element, the element may be directly connected or connected to the other element, but it should be understood that another element may be "connected", "coupled", or "connected" between each element.

It will be further understood that the terms "comprises" and/or "comprising," when used in this specification, specify the presence of stated components, steps, operations, and/or elements, but do not preclude the presence or addition of one or more other components, steps, operations, and/or elements.

Components included in any one embodiment and components including common functions may be described using the same name in another embodiment. Unless otherwise stated, the description given in any one embodiment may also be applied to other embodiments, and specific descriptions may be omitted within a redundant range or a range that can be understood by those skilled in the art.

Hereinafter, some embodiments of the inventive concept will be described in detail with reference to the accompanying drawings.

Hereinafter, the present invention will be described in detail with reference to preferred embodiments of the present invention and the accompanying drawings.

FIG. 1 is a block diagram of a lookup argument system according to an example embodiment.

Referring to FIG. 1, the lookup argument system 10 is a system for checking whether an index vector e is an element included in a table vector T, and components included in the lookup argument system 10 may include a plurality of terminals. In an example, the setup module 100, the prover 200, and the verifier 300 may each be configured as at least one terminal, and the at least one terminal may include various communication-capable terminals such as a cellular phone, a smart phone, a laptop, a personal computer (PC), a navigation system, a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA Wibro), a wireless broadband Internet terminal, a smart pad, a tablet PC, and the like. In another example, each of a setup module 100, a prover 200, and a verifier 300 may be implemented as a server.

The setup module 100, the prover 200, and the verifier 300 may be connected to each other through a network capable of communicating with each other by wire or wirelessly, and when they are connected by wire, the network may use a serial method, and when they are connected wirelessly, the network may communicate with each other using a wireless communication network. The wireless communication network includes a Local Area Network (LAN), a Wide Area Network (WAN), a World Wide Web (WWW), a wired/wireless data communication network, a telephone network, a wired/wireless television communication network, 3G, 4G, 5G, 3rd Generation Partnership Project (3GPP), 5th Generation Partnership Project (5GPP), Long Term Evolution (LTE), World Interoperability for Microwave Access (WIMAX), Wi-Fi, Internet, a Local Area Network (LAN), a Wireless Local Area Network (Wireless LAN), a Wide Area Network (WAN), a Personal Area Network (PAN), a Radio Frequency (RF), a Bluetooth network, a Near-Field Communication (NFC) network, a satellite broadcasting network, an analog broadcasting network, a Digital Broadcasting (DMB) network, a blockchain network, and the like, but is not limited thereto.

In the present specification, the operation of the lookup argument system 10 and the operation of each component included in the lookup argument system 10 may mean an operation performed by a processor included in each component, based on a computer program including at least one instruction stored in a storage device included in each component, and the storage device may include a non-volatile memory, a volatile memory, a flash memory, a hard disk drive (HDD), a solid state drive (SSD), or the like. The processor may include at least one of a central processing unit (CPU), a graphic processing unit (GPU), a neural processing unit (NPU), a random access memory (RAM), a read only memory (ROM), a system bus, and an application processor.

The setup module 100 may generate a prime number table vector Th based on the table vector T. In an embodiments, the setup module 100 may generate the prime number table vector Th by performing concatenation operation on the table values of the table vector T with random values of a prime number, which will be described in detail with reference to FIGS. 3 to 5.

The prover 200 may receive an index vector e and an accumulation value acc, and may determine whether the index vector e is a valid value included in the table vector T, by using an RSA accumulator-based lookup argument method or an RSA accumulator-based proof of membership method. For this purpose, the prover 200 may include a zero-knowledge proof module 210 and an RSA accumulator lookup argument module 220. The zero-knowledge proof module 210 may generate a first proof value as to whether the prime number table vector Th has been properly made based on a zero-knowledge proof circuit, and may generate a second proof value as to whether the duplication processing of the index vector e has been properly performed. The RSA accumulator lookup argument module 220 may generate a third proof value indicating whether the index vector e is included in the table vector T, based on the RSA accumulator-based proof of membership method using a zero-knowledge proof circuit. The first proof value to the third proof value may be transmitted to the verifier 300 as the proof value pi. The zero-knowledge proof module 210 and the RSA accumulator lookup argument module 220 may include a software module and/or a hardware module for performing each verification.

The verifier 300 may verify whether the proof of the prover 200 has been performed in a legitimate method based on the proof value pi. In an embodiment, the verifier 300 may verify the proof value pi by using the zero-knowledge proof method. In the present specification, the zero-knowledge proof method is a method of verifying the integrity of a message without checking the message (e.g., index vector e), and in an example, zero-knowledge SNARK (zk-SNARK) and cc-SNARK may be utilized as the zero-knowledge proof method.

According to the inventive concept of the present disclosure, the lookup argument system 10 may generate the prime number table vector Th by factoring the table vector T into primes, and may process the duplicated element of the index vector e, thereby utilizing the RSA accumulator-based proof of membership method even in a condition in which the prime number is included and the duplicated element is present, and as a result, RSA accumulator lookup argument may be possible.

In addition, according to an embodiment of the present disclosure, when the lookup argument system 10 performs zero-knowledge proof on the prime number table vector Th by generating the prime number table vector Th using a concatenation operation, it may be possible to verify at a high speed.

In addition, according to an embodiment of the present disclosure, when the lookup argument system 10 performs the duplication processing of the index vector e, the zero-knowledge proof may be performed by using a simple equation, and as a result, the zero-knowledge proof may be performed at a high speed.

Figure 2:
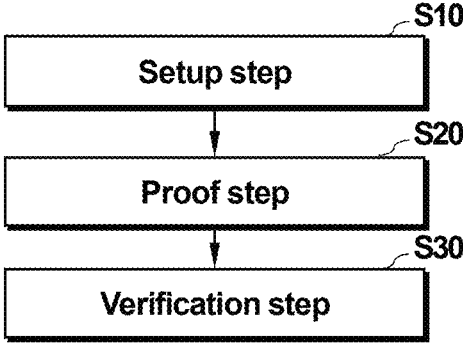
FIG. 2 is a flowchart of a lookup argument method according to an example embodiment.

FIG. 2 is a flowchart of a lookup argument method according to an example embodiment.

Referring to FIG. 2, the lookup argument method may include a setup step S10, am proof step S20, and a verification step S30. In the setup step S10, various parameters for the lookup argument method may be defined. In an embodiment, in the setup step S10, a prime number table vector may be generated based on the table vector. In addition, various parameters for the RSA accumulator-based proof of membership method may be additionally defined. The setup step S10 will be described in detail later with reference to FIGS. 3 to 5.

In the proof step S20, a proof value pi for zero-knowledge proof may be generated using the zero-knowledge proof module 210 and the RSA accumulator lookup argument module 220. In an embodiment, in the proof step S20, a temporary vector having no duplication may be generated by performing duplication processing on the index vector, and an RSA accumulator-based proof of membership method may be performed using the temporary vector.

In the verification step S30, verification may be performed on whether the prime number table vector generated in the setup step S10 has been properly generated, whether the duplication processing of the temporary vector generated in the proof step S20 has been properly performed, and whether the RSA accumulator lookup argument performed in the proof step S20 has been properly performed, by utilizing the proof value generated in the proof step S20.

Figure 3:
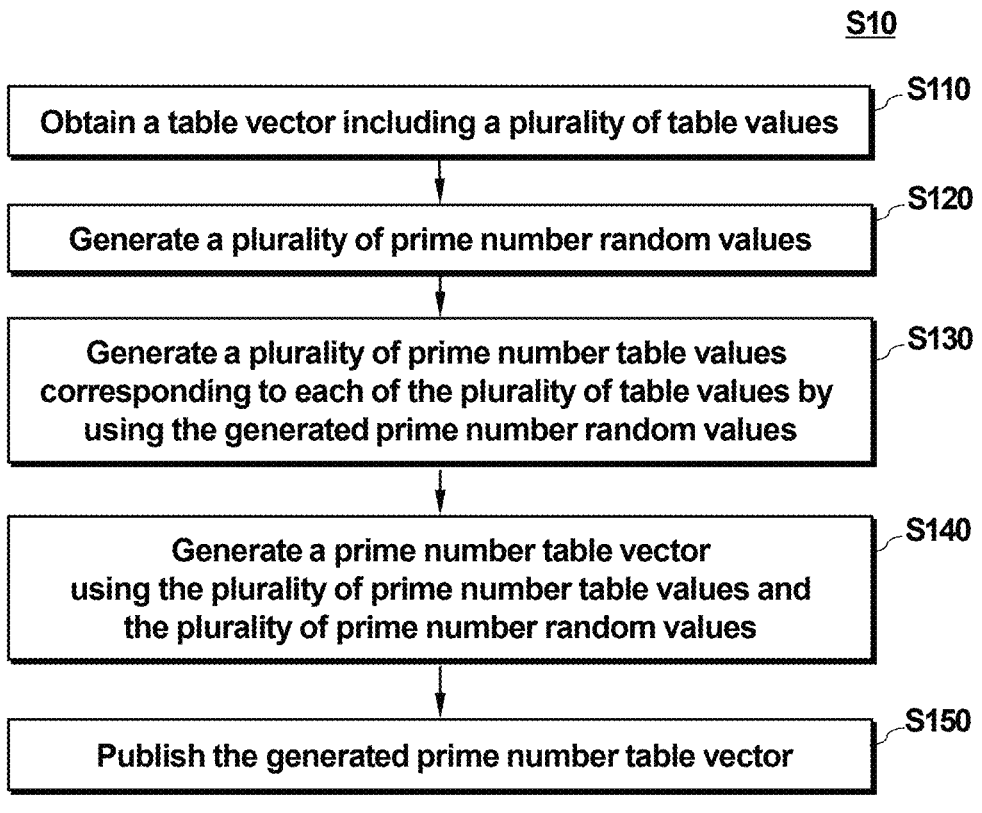
FIG. 3 is a flowchart of a setup step S10 according to an example embodiment.

FIG. 3 is a flowchart of a setup step S10 according to an example embodiment, and FIG. 4 is a diagram illustrating a setup algorithm according to an example embodiment.

Referring to FIGS. 3 and 4, the setup module 100 may obtain a table vector T including a plurality of table values, step S110. The table vector T may be previously published to utilize RSA accumulator-based proof of membership, and the setup module 100 may obtain the published table vector T.

The setup module 100 may generate a plurality of prime number random values, step S120, and generate a plurality of prime number table values corresponding to each of the plurality of table values by using the generated prime number random values, step S130. In an embodiment, the setup module 100 may generate the prime number table value by performing concatenation operation on the prime number random value with the table value. In an embodiment, the setup module 100 may generate the prime number table value by repeating a process of checking whether a value generated after the concatenation operation on the table value is prime number by using the prime number random values.

In an example, when a table value is $T_i$, a prime number random value is $z_i$, and a prime number table value is $Th_i$, the prime number table value may be determined according to Equation 1 below (N is a digit of the prime number random value).

$$Th_i = T_i \| z_i = T_i \cdot 2^N + z_i \qquad \text{[Equation 1]}$$

The setup module 100 may generate a prime number table vector Th using a plurality of prime number table values and a plurality of prime number random values, step S140. The setup module 100 may publish the generated prime number table vector to utilize the RSA accumulator-based lookup argument method according to the technical idea of the present disclosure, step S150.

In order to utilize the conventional RSA accumulator-based proof of membership method, it is required that all elements be a prime number. In the RSA accumulator-based lookup argument method according to the technical idea of the present disclosure, even if the components of the table vector to be indexed are not a prime number but a composite number, the components may be converted into the prime number, so that the conventional RSA accumulator-based proof of membership method may be used even for the table vector including the composite number, and as a result, RSA accumulator-based lookup argument for the table vector using the composite number may be possible.

In addition, in the RSA accumulator-based lookup argument method according to the technical idea of the present disclosure, when a composite number is made to be a prime number, the composite number may be made to be a prime number using a concatenation operation rather than a method such as a hash function, and proof of the RSA accumulator-based lookup argument method may also be performed rapidly due to the characteristics of the concatenation operation in which zero-knowledge proof may be performed relatively quickly and easily.

In addition, in the RSA accumulator-based lookup argument method according to an embodiment of the present disclosure, not only prime number table values but also prime number random values may be included in the prime number table vector Th, so that proof of the prime number random values may also be performed, and by using the prime number random value, fast and accurate zero-knowledge proof may be possible.

FIG. 5 is a diagram illustrating a setup step according to an example embodiment.

Referring to FIG. 5, the setup module 100 may obtain a table vector T including a plurality of table values t1 to t5, and may obtain a plurality of prime number random values z1 to z5. In an example, the setup module 100 may randomly determine a plurality of prime number random values from a group including a plurality of prime number values.

The setup module 100 may generate a plurality of prime number table values th1 to th5 by performing a concatenation operation on the plurality of table values t1 to t5 with the plurality of prime number random values z1 to z5. In an example, the setup module 100 may generate a first prime number table value th1 by concatenating the prime number random value (z1='0101') to the first table value (t1='0010') and checking whether the concatenated value '00100101' is a prime number. If the concatenated value is not a prime number, the same method may be performed by changing the prime random value.

As a result, the setup module 100 may generate the first prime number table value (th1='00100101') by concatenating the first prime number random value (z1='0101') to the first table value (t1='0010'), and may generate a second prime number table value th2 to a fifth prime number table value th5 corresponding to each of a second table value t2 to a fifth table value t5 in the same manner.

The setup module 100 may generate a prime table vector Th composed of only prime numbers by including the generated first prime table value th1 to fifth prime table value th5 and the first prime random value z1 to fifth prime random value z5 used to generate the first prime table value th1 to fifth prime table value th5.

According to an embodiment of the present disclosure, the setup module 100 may perform lookup argument by using a conventional RSA accumulator-based proof of membership method by converting a table vector into a prime number table vector composed of only a prime number by using a concatenation operation, and high-speed zero-knowledge proof may be possible.

FIG. 6 is a flowchart illustrating a proof step S20 according to an example embodiment, and FIG. 7 is a diagram illustrating a proof algorithm according to an example embodiment.

Referring to FIGS. 6 and 7, the prover 200 may obtain a prime number table vector, step S210, and may receive an index vector including a plurality of index values respectively corresponding to a plurality of prime number table values, step S220.

According to an exemplary embodiment of the present disclosure, an index vector may be a target for checking whether it is included in a prime number table vector.

The prover 200 may generate a temporary vector by processing a duplicated value among a plurality of index values by using a prime number table vector, step S230. In an embodiment, the prover 200 may generate the temporary vector by replacing the duplicated value among the plurality of index values with the plurality of prime number table values included in the prime number table vector.

According to an exemplary embodiment of the present disclosure, the prover 200 may use an RSA accumulator-based proof of membership method that does not allow duplication by replacing a duplicated component with a different value of a prime number table vector for a prime number table vector in which components may be duplicated, and as a result, lookup argument may be possible.

The prover 200 may perform a zero-knowledge proof on the plurality of prime number table values, step S240. In an embodiment, the prover 200 may perform a zero-knowledge proof on Equation 1 regarding whether prime number table values are generated by using the table values and the prime number random values. The prover 200 may generate a first proof value as a result of the zero-knowledge proof.

The prover 200 may perform a zero-knowledge proof on the temporary vector and the index vector, step S250. In an embodiment, the prover 200 may check through the zero-knowledge proof whether the temporary vector includes the components of the index vector and whether the temporary vector has no duplication. In an example, the prover 200 may perform a zero-knowledge proof on the component $e_i$ of the temporary vector and the component $f_i$ of the index vector of Equation 2 below, and generate a second proof value.

$$\prod_{i=2}^{m}(f_i - e_i)\cdot(f_i - f_{i-1}) = 0 \wedge f_1 = e_1 \qquad \text{[Equation 2]}$$

According to an embodiment of the present disclosure, in the zero-knowledge proof that takes a long time to prove, high-speed lookup argument may be possible by performing proof using Equations 1 and 2, which take a relatively short time to prove.

The prover 200 may perform an RSA accumulator-based lookup argument that checks whether the index values are included in the prime number table vector by using the temporary vector, step S260. In an embodiment, the prover 200 may perform the lookup argument by applying an RSA accumulator-based proof of membership method to the temporary vector and the prime number table vector.

According to an exemplary embodiment of the present disclosure, by performing preprocessing on a point that a component that may be generated when using lookup argument is a composite number and a point that the component is duplication, the component may be changed to a prime number and the duplication may be removed, and as a result, lookup argument may also be performed by using the RSA accumulator-based proof of membership method.

FIG. 8 is a diagram illustrating a proof step according to an example embodiment.

Referring to FIG. 8, the prover 200 may receive an index vector f including a first index value f1 corresponding to the first prime number table vector th1, a second index value f2 and a third index value f3 corresponding to the second prime number table vector th2, and a fourth index value f4 corresponding to the third prime number table vector th3.

The prover 200 may generate a temporary vector e by removing duplication of the index vector f. In an embodiment, the prover 200 may generate the temporary vector e by replacing the duplicated index value of the index vector f with a prime number table value that is not utilized in the index vector f in the prime number table vector Th.

In the example of FIG. 8, since the second index value f2 and the third index value f3 are duplicated as the second prime number table vector th2, the prover 200 may generate the temporary vector e by replacing the third index value f3 with the fifth prime number table vector th5 that is not utilized in the index vector f.

According to an exemplary embodiment of the present disclosure, the prover 200 may use an RSA accumulator-based proof of membership method that does not allow duplication by replacing a duplicated component with a different value of a prime number table vector for a prime number table vector in which components may be duplicated, and as a result, lookup argument may be possible.

FIG. 9 is a diagram illustrating a verification algorithm according to an example embodiment.

Referring to FIG. 9, the verifier 300 may receive a proof value pi, x from the prover, and may check whether the proof of the prover 200 is correct based on a zero-knowledge proof method using the proof value. In detail, the verifier 300 may verify whether the prime number table vector generated by the setup module 100 is properly generated using the proof value, whether the duplication processing of the temporary vector generated by the prover 200 is properly performed, and whether the RSA accumulator lookup argument performed by the prover 200 is properly performed.

Figure 10:
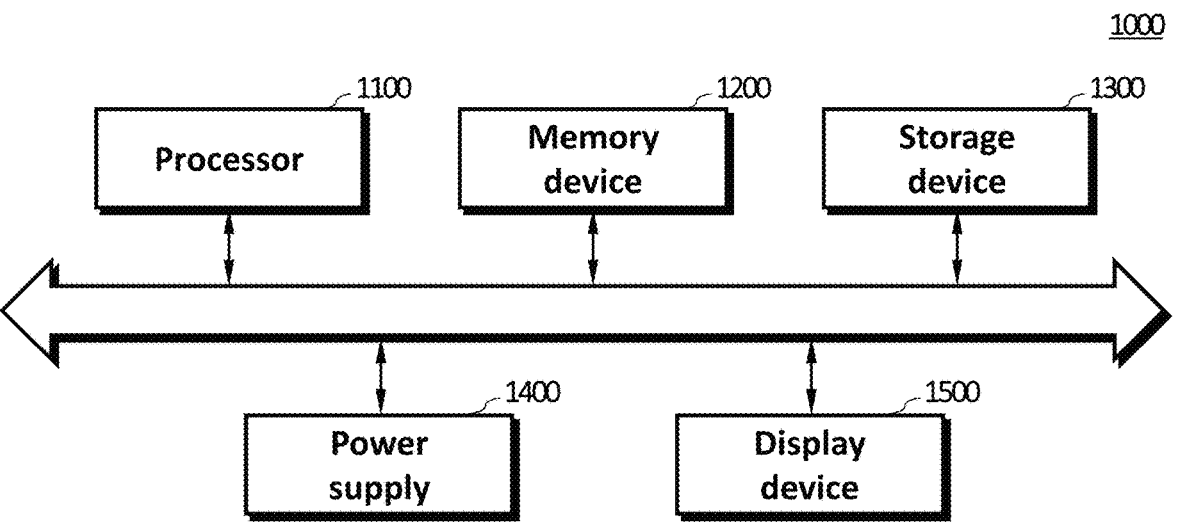
FIG. 10 is a block diagram of a computing system according to an example embodiment.

FIG. 10 is a block diagram of a computing system according to an example embodiment.

Referring to FIG. 10, the computing system 1000 may configure any one of at least one component 100, 200, 300, and 400 constituting the lookup argument system 10, and may include a processor 1100, a memory device 1200, a storage device 1300, a power supply 1400, and a display device 1500. Although not illustrated in FIG. 10, the computing system 1000 may further include ports that communicate with a video card, a sound card, a memory card, a universal serial bus (USB) device, or other electronic devices.

As described above, the processor 1100, the memory device 1200, the storage device 1300, the power supply 1400, and the display device 1500 included in the computing system 1000 may perform the RSA accumulator-based lookup argument method according to example embodiments. In detail, the processor 1100 may perform the RSA accumulator-based lookup argument method described with reference to FIGS. 1 to 9 by controlling the memory device 1200, the storage device 1300, the power supply 1400, and the display device 1500.

The processor 1100 may perform specific calculations or tasks. According to an embodiment, the processor 1100 may be a micro-processor or a Central Processing Unit (CPU). The processor 1100 may communicate with the memory device 1200, the storage device 1300, and the display device 1500 through a bus such as an address bus, a control bus, and a data bus. In an embodiment, the processor 1100 may be connected to an expansion bus such as a Peripheral Component Interconnect (PCI) bus.

The memory device 1200 may store data necessary for the operation of the computing system 1000. For example, the memory device 1200 may be implemented as a dynamic random access memory (DRAM), a mobile DRAM, a static random access memory (SRAM), a phase-change random access memory (PRAM), a ferroelectric random access memory (FRAM), a resistive random access memory (RRAM), and/or a magnetic random access memory (MRAM). The storage device 1300 may include a solid state drive (SDD), a hard disk drive (HDD), a CD-ROM, etc. The storage device 1300 may store a program associated with the RSA accumulator-based lookup argument method described with reference to FIGS. 1 to 9, application program data, system data, operating system data, etc.

The display device 1500 may be an output means for performing a notification with respect to a user, and may display and notify various types of information described in the present specification to a user or the like. The power supply 1400 may supply an operating voltage necessary for an operation of the computing system 1000.

According to the inventive concept, when a composite number is converted into a prime number in a setup step, a zero-knowledge proof may be performed in a short time and an RSA accumulator-based lookup argument method may be used by utilizing a connection function, and even if index elements are duplicated, the RSA accumulator-based lookup argument method may be used by processing a duplicated element in a proof step.

Exemplary embodiments have been invented in the drawings and the specification as described above. Although the embodiments have been described using specific terms in the present specification, they are used only for the purpose of describing the technical spirit of the present invention, and are not used to limit the meaning or limit the scope of the present invention described in Claims. Therefore, those of ordinary skill in the art will understand that various modifications and other equivalent embodiments are possible therefrom. Therefore, the true technical protection scope of the present invention should be defined by the technical spirit of the appended Claims.

What is claimed is:

1. A Rivest-Shamir-Adleman (RSA) accumulator-based lookup argument method performed by at least one processor, the method comprising:
   obtaining a table vector comprising a plurality of table values;
   generating a plurality of prime number random values;
   generating a plurality of prime number table values respectively corresponding to the plurality of table values by using the plurality of prime number random values;
   generating a prime number table vector using the plurality of prime number table values and the plurality of prime number random values;
   publishing the prime number table vector;
   receiving an index vector comprising a plurality of index values respectively corresponding to at least one prime number table value;
   generating a temporary vector comprising a plurality of temporary values by processing a duplicated value among the plurality of index values by using the prime number table vector;
   performing an RSA accumulator-based lookup argument in a blockchain to check whether an index value among the plurality of index values is included in the table vector by using the prime number table vector and the temporary vector;
   providing verifiability of an object corresponding to an index value among the plurality of index values in the blockchain by confirming whether the index value is included in membership based on the RSA accumulator-based lookup argument even in a condition in which the plurality of prime number random values is included in the prime number table vector, and
   executing a blockchain transaction associated with the object corresponding to the index value in response to providing the verifiability.

2. The lookup argument method of claim 1,
   wherein the generating the prime number table vector comprises:
   performing a concatenation operation on each of the plurality of table values with each of the plurality of prime number random values;
   checking whether a value on which the concatenation operation is performed is a prime number;
   determining the value as the prime number table value corresponding to the table value when the value on which the concatenation operation is performed is the prime number; and
   generating the plurality of prime number table values corresponding to the plurality of table values as the prime number table vector.

3. The lookup argument method of claim 2, further comprising:
   performing a zero-knowledge proof on the generating of the plurality of prime number table values as a result of the concatenation operation on the plurality of table values with the plurality of prime number random values; and
   transmitting a first proof value as a result of the zero-knowledge proof.

4. The lookup argument method of claim 1, wherein the generating the temporary vector comprises:
   replacing an index value duplicating another element of the index vector among the plurality of index values with any one of the prime number table vector; and
   generating a vector generated as a result of the replacing as the temporary vector.

5. The lookup argument method of claim 1, further comprising:
   performing a zero-knowledge proof with respect to the following equation where i-th element of the temporary vector is $e_i$ and i-th element of the index vector is $f_i$; and
   transmitting a second proof value as a result of the zero-knowledge proof.

$$\prod_{i=2}^{m}(f_i - e_i) \cdot (f_i - f_{i-1}) = 0 \wedge f_1 = e_1$$

6. The lookup argument method of claim 1, wherein the performing the RSA accumulator-based lookup argument is performed outside a zero-knowledge proof circuit.

7. A Rivest-Shamir-Adleman (RSA) accumulator-based lookup argument method performed by at least one processor, the method comprising:
   obtaining a prime number table vector comprising a plurality of prime number table values;
   receiving an index vector comprising a plurality of index values respectively corresponding to at least one of the plurality of prime number table values;
   generating a temporary vector comprising a plurality of temporary values by processing a duplicated value among the plurality of index values by using the prime number table vector;
   performing an RSA accumulator-based lookup argument in a blockchain to check whether the plurality of index values is included in the prime number table vector using the temporary vector;
   providing verifiability of an object corresponding to an index value among the plurality of index values in the blockchain by confirming whether the index value is included in membership based on the RSA accumulator-based lookup argument even in a condition in which the plurality of prime number random values is included in the prime number table vector, and
   executing a blockchain transaction associated with the object corresponding to the index value in response to providing the verifiability.

8. The lookup argument method of claim 7, wherein the generating the temporary vector comprises:
   replacing an index value duplicating another element of the index vector among the plurality of index values with any one of elements of the prime number table vector; and
   generating a vector generated as a result of the replacing as the temporary vector.

9. The lookup argument method of claim 8, further comprising:

performing a zero-knowledge proof with respect to the following equation, where i-th element of the temporary vector is $e_i$ and i-th element of the index vector is $f_i$; and transmitting a proof value generated as a result of the zero-knowledge proof $$\prod_{i=2}^{m}(f_i - e_i) \cdot (f_i - f_{i-1}) = 0 \land f_1 = e_1$$

\* \* \* \* \*